(12) United States Patent
Schoke et al.

(10) Patent No.: US 9,073,299 B2
(45) Date of Patent: Jul. 7, 2015

(54) METHOD AND A SPRAYING DEVICE FOR THE REPAIR OF A SANDWICH PLATE

(75) Inventors: Berend Schoke, Twistringen (DE); Michael Doecker, Bremen (DE)

(73) Assignee: Airbus Operations GmbH (DE)

( * ) Notice: Subject to any disclaimer, the term of this patent is extended or adjusted under 35 U.S.C. 154(b) by 774 days.

(21) Appl. No.: 12/846,116

(22) Filed: Jul. 29, 2010

(65) Prior Publication Data
US 2011/0030878 A1 Feb. 10, 2011

Related U.S. Application Data

(60) Provisional application No. 61/229,288, filed on Jul. 29, 2009.

(30) Foreign Application Priority Data

Jul. 29, 2009 (DE) .......................... 10 2009 035 108

(51) Int. Cl.
| | |
|---|---|
| B32B 43/00 | (2006.01) |
| B32B 3/12 | (2006.01) |
| B05D 7/00 | (2006.01) |
| B05D 7/22 | (2006.01) |
| B29C 73/02 | (2006.01) |
| B32B 5/28 | (2006.01) |
| B32B 27/02 | (2006.01) |
| B32B 27/04 | (2006.01) |
| B32B 27/12 | (2006.01) |
| B32B 27/34 | (2006.01) |
| B32B 27/38 | (2006.01) |
| B64F 5/00 | (2006.01) |
| B05B 7/24 | (2006.01) |
| B29C 73/26 | (2006.01) |

(52) U.S. Cl.
CPC . *B32B 43/00* (2013.01); *B05D 7/22* (2013.01); *B05B 7/2472* (2013.01); *B29C 73/02* (2013.01); *B29C 73/025* (2013.01); *B29C 73/26* (2013.01); *B32B 3/12* (2013.01); *B32B 5/28* (2013.01); *B32B 27/02* (2013.01); *B32B 27/04* (2013.01); *B32B 27/12* (2013.01); *B32B 27/34* (2013.01); *B32B 27/38* (2013.01); *B32B 2305/024* (2013.01); *B32B 2305/028* (2013.01); *B32B 2398/10* (2013.01); *B64F 5/0081* (2013.01)

(58) Field of Classification Search
USPC ......................................................... 427/230
See application file for complete search history.

(56) References Cited

U.S. PATENT DOCUMENTS

2004/0028877 A1* 2/2004 Itoh et al. ...................... 428/118

FOREIGN PATENT DOCUMENTS

| | | |
|---|---|---|
| DE | 102006044486 A1 | 4/2008 |
| JP | 2006305750 A | 11/2006 |

OTHER PUBLICATIONS

Heitz, E., "Die Reparatur von Sandwichbauteilen," Plastverarbeiter, vol. 28, 1977, nr. 9, pp. 469-476.*
Heitz, E.; Die Reparatur von Sandwichbauteilen; In Plastverarbeiter,28th Volume, 1977, No. 9, pp. 469-476.
Office Action from the German Patent and Trade Mark Office dated Sep. 3, 2012 for Application No. 10 2009 035 108.6, filed on Jul. 29, 2009.

* cited by examiner

*Primary Examiner* — William Phillip Fletcher, III
(74) *Attorney, Agent, or Firm* — Lerner, David, Littenberg, Krumholz & Mentlik, LLP

(57) ABSTRACT

A method for the repair of a sandwich plate having a core structure, a top surface layer and a bottom surface layer and a plurality of honeycomb-shaped cells includes providing at least one penetrating drill hole in at least one of the top surface layer and the bottom surface layer above one of the plurality of honeycomb-shaped cells in a damaged region of the sandwich plate, injecting a stabilising material into the honeycomb-shaped cell, and filling the damaged region with a filler material.

19 Claims, 3 Drawing Sheets

METHOD AND A SPRAYING DEVICE FOR THE REPAIR OF A SANDWICH PLATE

CROSS REFERENCE TO PRIOR APPLICATIONS

Priority is claimed to German Application No. DE 10 2009 035 108.6, filed Jul. 29, 2009 and U.S. Provisional Application No. 61/229,288, filed Jul. 29, 2009. The entire disclosure of both documents is incorporated by reference herein.

FIELD

The invention concerns a method for the repair of a sandwich plate, in particular a floor plate in an aircraft, wherein the sandwich plate has a core structure, provided on both sides with surface layers, with a multiplicity of in particular honeycomb-shaped cells.

BACKGROUND

Sandwich plates find widespread application in aircraft construction by virtue of their extraordinarily favourable ratio between achievable rigidity and weight. For example, floor plates, which are constructed using sandwich plates with a honeycomb-shaped core structure and surface layers of carbon fibre-reinforced epoxy resins fitted on both sides of the core structure, are installed in passenger cabins or in freight compartments. These floor plates, forming the floor above the floor structure of the aircraft fuselage cell, are as a rule individually tailored and separately matched to each type of aircraft. Moreover the floor plates in what are called the wet regions of the aircraft fuselage cell, for example, in the region of toilet facilities, kitchen equipment and in the entrance area into the passenger cabin must be configured so as to be sealed against fluids, as a result of which the installation outlay increases. In normal flight operations of a passenger aircraft the floor plates are themselves subjected to high mechanical loadings in what is often also a chemically aggressive environment. High point loads are caused, for example, by rolling service carts, wheeled suitcases, certain types of shoe heels, and also falling objects.

These result in indentations (so-called "impacts") of the upper surface layer of the floor plate, and vertical compressions of the core structure in the region of damage. As a consequence of the compressions a further result is spalling of the impregnation of the core structure, as a result of which the latter's strength is severely impaired. Without timely repair of the region of damage in question the latter extends ever further outwards, and can lead to deterioration of the floor plate over a large area. Removal and replacement of the floor plate in question is as a rule not possible in the field, and moreover would also be linked with excessive costs for labour and materials. Moreover as a result of the individual adaptations of the floor plates it would be necessary to maintain a large stock of these plates for each type of aircraft.

In a method of known art for the repair of floor plates in passenger cabins of aircraft all honeycomb cores located in the damage location region are opened up by drilling and filled with a curable synthetic resin material. The connection with the upper surface layer in the region of damage is then filled with a likewise curable plastic material. What is disadvantageous in this procedure is that filling the honeycombs is not possible without the formation of air bubbles, where these preferentially move into the region below the upper surface layer. However, it is exactly in this region, in which from experience the largest distortion of the core structure occurs, that the maximum stabilisation effect is required from the introduced plastic material.

In accordance with a further procedure a drilled hole is firstly introduced into the floor plate in the damage location region. A rotating hook is then inserted through this hole into the sandwich plate, and by means of this hook the core structure is largely destroyed in the region of rotation, so as to create a large cavity to be filled with a curable plastic material for the particular purpose of vertical stabilisation. Subsequently, or earlier in the preparatory work, a further drilled hole is set into the upper surface layer of the floor plate in the region of damage to allow air to escape. Subsequently the indentation that is usually present in the upper surface layer of the floor plate is filled. One advantage of this procedure lies in the fact that in the damage location region only two holes have to be introduced into the floor plate in the region of the surface layer. However, the main disadvantage of this procedure is to be seen in the fact that in the damage location region destruction of the honeycomb-shaped core structure takes place over a large volume.

In a further method variant of previously known art the cells of the core structure in the damage location region are firstly opened up by drilling. A thin fluid, low viscosity, curable plastic material is then introduced into the cells in question. By pivoting and rotating the plate freely in space an even wetting of the cell walls with a stabilising plastic material is effected. However, this method necessarily assumes the removal of the floor plate that is to be repaired.

SUMMARY OF THE INVENTION

Accordingly, an aspect of the invention is to create an improved method that enables a simple, rapid and cost-effective repair option for regions of damage in sandwich plates, in particular floor plates of aircraft, in the field, and without the necessity of removing the sandwich plate.

This task is achieved by means of a method which comprises the following steps:

a) Introduction in each case of at least one penetrating drilled hole into a surface layer above at least one cell in a region of damage of the sandwich plate, b) Injection of a stabilising material into the at least one cell, and c) Filling of the region of damage with a filler material.

By the injection of the stabilising material a reliable, quick and above all even, that is to say, in particular, a full surface area wetting of the walls of the honeycomb-shaped cells of the core structure of the sandwich plate, which are to be mechanically stabilised because compressed by damage, is ensured.

After curing of the stabilising material has taken place the hollow-shaped indentation of the upper surface layer of the sandwich plate that is usually present can be provided with a filler material. While it is true that the injection of the stabilising material cannot restore the original spatial geometry of the honeycomb-shaped cells in the region of damage, the stabilising material is deposited as a full surface area film onto the inner surfaces of the cells of the core structure and can thus develop its stabilisation effect.

An advantageous further development of the method envisages that the filler material is applied after the curing of the plastic material in the region of damage.

By this means the removal of air from the stabilising material injected into the core structure in the region of damage is eased and at the same time the curing time is reduced. Alternatively the filler material can also be applied directly after the introduction of the stabilising material into the core structure in the region of the indentation of the damage location.

A further development of the method envisages that the region of damage is filled with the filler material to the extent that a flush connection with the associated surface layer of the sandwich plate is achieved.

As a consequence of this configuration the original surface finish of the sandwich plate that is being repaired is to a large extent restored. After the fitting of any floor coverings the repair location can no longer be discerned visually.

In accordance with a further development of the method the filler material is a curable, thermosetting, plastic material, in particular an epoxy resin, or a polyester resin, filled with hollow glass spheres.

In principle the filler material should be matched to the material of the surface layers of the sandwich plate that is being repaired, so as to achieve an adhesion of the filler material onto the surface layer that is as good as possible. As a rule the sandwich plates that find application as floor plates in the passenger cabins of aircraft are provided with surface layers that are formed with carbon fibre-reinforced epoxy resins.

In such a set-up the filler material used to fill the indentations in the region of the surface layers in question is formed with an epoxy resin, or a polyester resin, filled with hollow glass spheres. As a result of the hollow glass spheres that are mixed in (so-called "micro-balloons") the weight of the filler material is reduced, while at the same time high strengths can be achieved.

A further variant of the method envisages that the stabilising material is a plastic material based on one component.

By this means the stabilising material that is to be injected is particularly easy to work with. For example, in this set-up the stabilising material is injected by means of a simple device, whose construction is in principle similar to that of a conventional spraying nozzle, and which is filled with a suitable one-component plastic material, which is expelled by the action of a sufficiently effective volume of compressed gas. Of advantage is the fact that such a spraying device is easy to manipulate and is tailor-made for repairs in the field. However, the disadvantage of a one-component stabilising material under some circumstances is a lower mechanical strength.

The core structures of the sandwich plates usually installed as floor plates in aircraft are in general formed with an appropriately folded polyamide paper (so-called Nomex® paper), which is saturated and/or coated with a phenolic resin. If the core structure is compressed in a damage location region of the sandwich plate, this phenolic resin coating can spall from some areas of the walls of the honeycomb-shaped cells, as a result of which the mechanical strength of the core structure is significantly reduced. By the spray coating of the stabilising material these spalled areas are filled in and evened out, so that the vertical load capacity of the core structure is raised once again. However, it is not possible to restore fully the original strengths with injection of the stabilising material because of the residual geometrical deformations of the core structure.

A further development of the method envisages that the stabilising material is a plastic material based on two components, in particular a curable epoxy resin, polyester resin, or phenolic resin.

For health reasons, however, use of an epoxy resin or polyester resin as the stabilising material is to be preferred compared with the phenolic resin systems. This is because during the "wet" processing of phenolic resin systems, that is to say, when they are initially not yet cured, the phenols and formaldehydes that are generated make extensive extraction and safety equipment essential, such as, for example, respirator masks, carbon filters, extraction fans and similar, as a result of which in-the-field repairs become more difficult.

In the case where there is a need to stabilise metallic core structures, a stabilising material based on a curable epoxy resin system, for example, can be of advantage. In principle it is possible to achieve higher mechanical strengths with stabilising materials based on two components, compared with those based on one component, although processing requires a higher level of outlay.

The task according to the invention is further achieved by means of a spraying device for the repair of a sandwich plate, in particular in accordance with the method according to at least one of the patent claims 1 to 6, wherein the sandwich plate has a core structure provided on both sides with surface layers, with a multiplicity of in particular honeycomb-shaped cells.

By filling a reservoir with a stabilising material based on one component, where the stabilising material can be evenly dispensed from the reservoir into a spraying tube, and can be atomised into a spray mist in a nozzle downstream of the spraying tube, a stabilising material based on one component can be evenly sprayed, through the spraying tube and a nozzle fitted downstream of the tube, directly in the region of the honeycomb-shaped cells that are to be stabilised of the core structure of the sandwich plate that is to be repaired. In this set-up solvent-based plastic materials in the form of spraying adhesives of known art or similar, for example, come into consideration as the stabilising material.

In the case of this first variant of embodiment of the spraying device a sufficiently large volume of compressed air is located above the surface of the fluid stabilising material in the reservoir—in a manner similar to conventional spraying nozzles—which serves to expel and atomise the stabilising material. The compressed air volume in the reservoir can already be provided by the manufacturer, or can be built up by means of compressed air cylinders connected with the reservoir via an external supply line. Here the even dispensation of the stabilising material from the reservoir guarantees in particular the generation of a uniform spray mist, and thus a coating thickness of stabilising material on the wall surfaces of the cells in the interior of the core structure that is as even as possible. In one variant the nozzle arranged at the end of the spraying tube has a nozzle hole or opening that generates a near-conical spray mist. Alternatively a spherical nozzle can be used at the end of the spraying tube, formed with a hollow sphere. On the surface of this hollow sphere are multiple small nozzle openings, preferably arranged evenly spaced apart from one another, so as to generate overall a near-spherical spray mist. With the spherical spray mist the simultaneous and even wetting of all wall surfaces of the honeycomb-shaped cells within the core structure becomes possible. In a preferred form of embodiment the spraying tube is flexible, for example, is designed in the form of a thermoplastic plastic tube. Alternatively a rigid metal pipe can also be used.

By providing two reservoirs, connected to one another via a Y-section, which are filled with two different components and from which the components can be evenly dispensed, it is possible to use stabilising materials that are formed by the mixing of two different components. The reservoirs for the accommodation of the two components of the stabilising material can, for example, be designed as hollow cylinders, in each of which a piston is fitted such that it can move. By the travel of the pistons inwards into the reservoirs it is then possible to deliver the components in question in a simple manner evenly into the Y-section connecting the reservoirs.

The preferably synchronous movement of the pistons can take place by means of a suitable feed device, preferably automatically driven. The feed device can, for example, be implemented in terms of spindles driven by electric motors, hydraulic rams, or pneumatic actuators. Alternatively the pistons can also be operated via a rack-and-pinion drive manually actuated by means of a lever mechanism.

In accordance with a further development of the device provision is made that a mixing tube is located downstream of the Y-section to mix the two components of the stabilising material.

By this means the mixing of the components begins only at the end of the Y-section in the region of its junction, so that any stabilising material component residues still remaining in the reservoirs—after separation of the same from the Y-section—can be stored for the long term without the risk of unwanted curing. In the event of longer work breaks, and/or longer spraying device standing times or storage times, it is just the mixing tube, spraying tube and nozzle, which in general are configured as a one-piece spraying unit of a suitable thermoplastic plastic material, that must be replaced with a new spraying unit.

In accordance with a further development of the device an air supply is connected downstream of the mixing tube; the air supply is connected with a compressor and/or a compressed air reservoir.

By means of the air supply an aerosol is generated, consisting of the air flowing in via the air supply, and the particles, i.e. extremely fine droplets of stabilising material, swirling in the airflow. However, this assumes a sufficiently low viscosity of the mixed stabilising material, similar to that of water. Moreover the delivery of the stabilising material through the spraying tube and the nozzle is assisted. By the use of mobile compressors and/or compressed air reservoirs mobile "in the field usage" of the device is furthermore possible, independently of stationary compressed air supply systems. Compressed air cartridges or cylinders of a suitable size and form of construction can, for example, be used as the compressed air reservoirs. The use of compressed air cartridges, preferably integrated into the spraying device, has the particular advantage that the spraying device remains light and easy to manipulate by the user. Moreover the use of such a compact compressed air reservoir allows the use of the device in confined installations, even if the usage time is limited as a result of the limited volume.

Mobile air compressors can, for example, find application as compressors; in comparison to the compressed air cartridges these allow unlimited continuous use of the device for the repair of sandwich plates. As an alternative to air other gases can also be used as the pressurised medium.

A further development of the device envisages that the one component of the stabilising material is in particular a resin component of an epoxy resin system, a polyester resin system, or a phenolic resin system, and the other component in particular is the curing component of the resin system in question.

By this means it is possible to repair the most common forms of embodiment of floor plates in aircraft with optimal results in the event of damage. Regardless of which resin system is used, its viscosity must be sufficiently low that even injection into the cells of the core structure is possible.

BRIEF DESCRIPTION OF THE DRAWINGS

In the drawings.

In the drawings the same design elements have the same reference number in each case.

DETAILED DESCRIPTION

Figure 1:
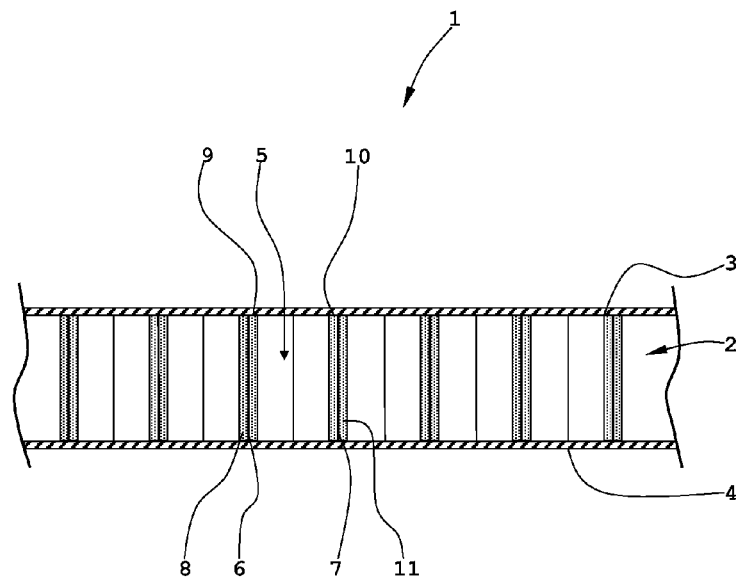
FIG. 1 shows a schematic illustration of a cross-section through a sandwich plate, which commonly finds application as a floor plate in aircraft.

FIG. 1 shows a schematic illustration of a cross-section through a sandwich plate, which finds widespread application as a floor plate in passenger cabins or freight compartments of aircraft.

The sandwich plate 1 comprises inter alia a core structure 2, which is provided on both sides with two surface layers 3, 4. The core structure 2 itself is formed with a multiplicity of honeycomb-shaped cells, of which one cell 5 is provided with a reference number to represent all the others. Both sides of the wall surfaces 6, 7 of the cell 5, and also all other cells of the core structure 2, are formed in this example of embodiment with a polyamide paper, which is saturated, coated and/or impregnated with a phenolic resin. (so-called Nomex® paper). In the illustration of FIG. 1 a total of four phenolic resin layers 8 to 11 are present on the two sides of the wall surfaces 6, 7, where the material thickness of the phenolic resin layers 8 to 11 is graphically illustrated in a strongly exaggerated manner in the interests of better visibility. In principle any materials can be used to create the core structure. For example core structures with honeycomb-shaped cells are often manufactured using thin-layer metallic materials, such as, for example, aluminium foils, or similar. Alternatively the polyamide paper can also be provided with epoxy resin layers.

Figure 2:
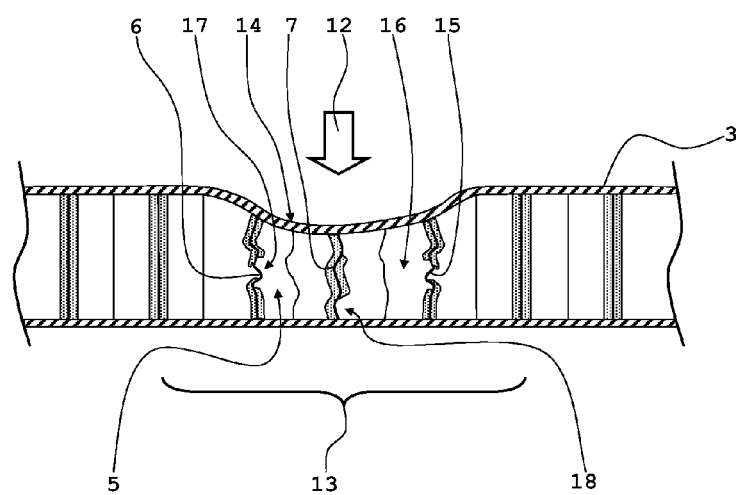
FIG. 2 shows the sandwich plate from FIG. 1 with damage caused by a high mechanical point load (a so-called "impact")

FIG. 2 shows the sandwich plate 1 after the action of a locally bounded, high mechanical load.

As a result of the action of a high point load 12 the upper surface layer 3 is indented in a region of damage 13, that is to say a hollow-shaped, or pan-shaped, depression 14 has been generated in the sandwich plate 1. It can clearly be discerned that the wall surfaces 6, 7 of the cell 5 have clearly been compressed, as has a wall surface 15 of a cell 16, adjacent to the cell 5 on its right-hand side, and similarly honeycomb-shaped. The result of the compression is that a multiplicity of spalled areas, of which the spalled areas 17, 18 have been provided with a reference number to represent all the others, occur in the phenolic resin layers 8 to 11. As a consequence of these spalled areas the mechanical load capacity of the wall surfaces 6, 7, 15 of the core structure 2 is severely impaired in the region of damage 13. Moreover without a timely repair the region of damage 13 increases in size with an exponentially increasing speed.

Figure 3:
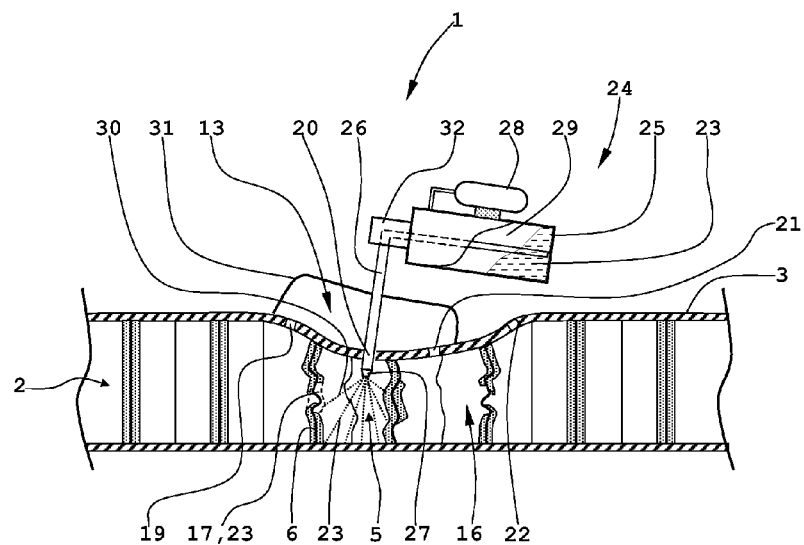
FIGS. 3, 4 show a repair of the sandwich plate from FIG. 2 in accordance with the method according to the invention.
Figure 4:
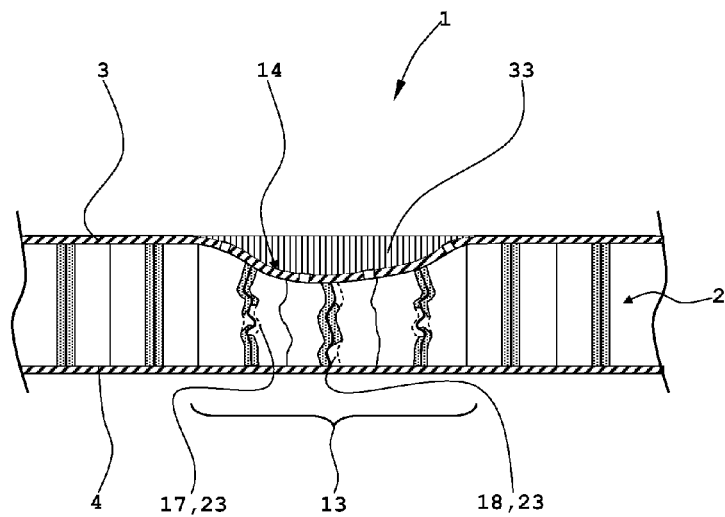

FIGS. 3, 4, to which reference is simultaneously made in the further progress of the description, show the sequence of the method according to the invention on the example of the region of damage 13 in the sandwich plate 1 illustrated in FIG. 2.

Firstly in a method step a) four penetrating holes 19 to 22 are introduced into the surface layer 3 in the region of damage 13, so as to make the honeycomb-shaped cells located underneath accessible from the exterior.

Next in a method step b), as shown for the example of hole 20, a stabilising material 23 is injected into the cell 5 using a spraying device 24. In the example of embodiment shown in FIG. 3 the stabilising material 23 is located in a reservoir 25 of the spraying device 24. The spraying device 24 is equipped with a spraying tube 26, which at its end is provided with a nozzle 27. By means of a pressurised cartridge 28, preferably filled with compressed air, a pressurised volume 29 can be constructed above the stabilising material 23 and by this means the stabilising material 23 is expelled out of the reservoir 25. The atomisation of the stabilising material 23 into the form of a spray mist 30 takes place, in a manner similar to that of spraying nozzles of known art, in the region of the nozzle 27 arranged at the end of the spraying tube 26. To ease the application of the stabilising material 23 the spraying tube 26 in preferably elastically, that is to say, flexibly, configured in the form of a hose. In order to avoid contamination of adjacent regions of the surface layer 3 of the sandwich plate 1, the spraying tube 26 is surrounded by an elastic collar 31. The collar 31 is designed so that it can be fitted to the spraying tube 26, and after use can be removed repeatedly. An outer diameter (not indicated) of the spraying tube 26 is matched to the diameter of the holes 19 to 22, so as on the one hand to enable easy introduction into the opened cells of the core structure 2, but on the other hand to prevent as far as possible an uncontrolled exit of the atomised stabilising material 23 from the region of damage 13. The spraying device 24 is further equipped with an actuation device 32, which allows precise manual regulation by the user of the quantity of stabilising material 23 exiting from the spraying tube 26, i.e. from the nozzle 27. The spraying device 24 is moreover designed such that the user can preferably direct the spraying device 24 with one hand, so that the region of damage 13 can be repaired even in the event of confined installations.

In the example of embodiment shown the stabilising material 23 takes the form of a curing plastic material based on one component, such as, for example, a solvent-based spray adhesive or similar, with a comparatively low viscosity, so as to enable atomisation and spraying by means of the nozzle 27. Alternatively the stabilising material 23 can be a curable plastic material based on two components, such as, for example, an epoxy resin, a polyester resin, or a phenolic resin. In this case however a variant of the spraying device 24 schematically illustrated in FIG. 3 must be introduced, with two reservoirs for holding the different resin components in a spatially separated manner.

Furthermore it can be discerned in the illustration of FIG. 3 that inter alia the spalled area 17 in the region of the left-hand side wall surface 6 of the cell 5 has already been completely filled, i.e. wetted, with the stabilising material 23, as indicated by the dashed line. All compressed wall surfaces of the damaged cells of the core structure 2 are stabilised, i.e. stiffened, in accordance with the procedural method elucidated above by the spray coating of the stabilising material 23. However, restoration of the original honeycomb-shaped geometry of the damaged, that is to say compressed, cells of the core structure 2 of the sandwich plate 1 is not possible with this method.

Preferably after the injected stabilising material 23 is completely cured, in a last method step c) the depression 14 in the region of damage 13 of the upper surface layer 3 of the sandwich plate 1 is preferably completely filled with a suitable, curable filler material 33, flush with the profile of the upper surface layer 3, as can be seen in FIG. 4. As the filler material 33, polyester resins or epoxy resins filled with hollow glass spheres come into consideration, for example—in each case depending on the materials used to form the surface layers 3, 4 of the core structure 2. Further method steps can be added as required, such as, for example, flat sanding or sealing of the filler material 33 introduced into the depression 14. Alternatively the filling of the depression 14 can also take place immediately after method step b). Furthermore it can be seen from FIG. 4 that the compressed wall surfaces are filled on both sides, i.e. completely wetted,—as indicated with dashed lines—with the stabilising material 23 to fill the spalled areas 17, 18.

Figure 5:
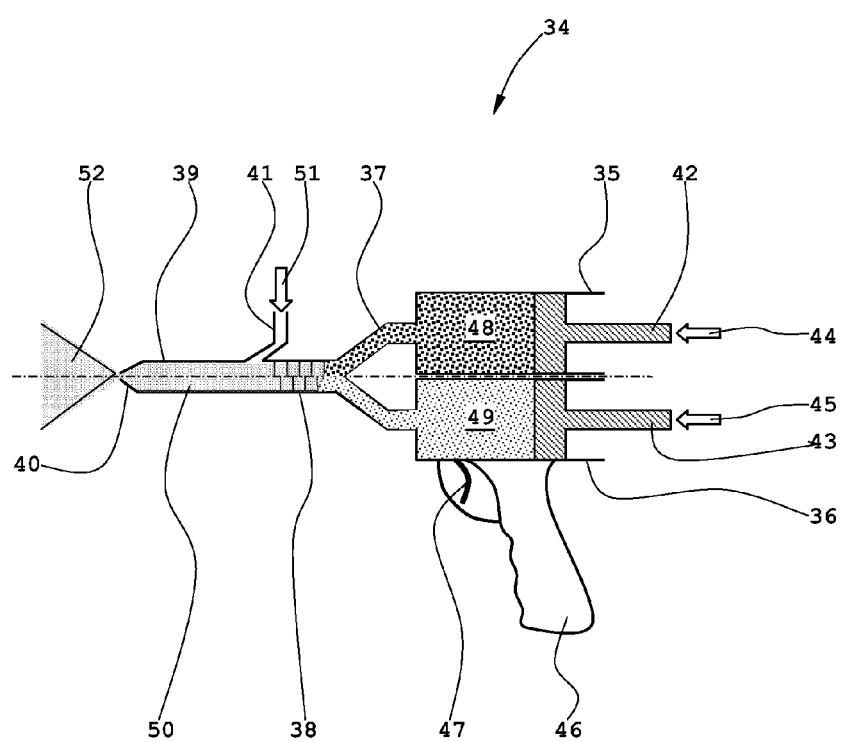
FIG. 5 shows a variant of embodiment of a device for execution of the method according to the invention using a stabilising material with two components.

FIG. 5 shows an illustration of the principle of a further example of embodiment of a spraying device, which in particular is provided for the injection of a stabilising material based on two components in the course of the method according to the invention.

In this variant of embodiment a spraying device 34 comprises inter alia two reservoirs 35, 36 that are connected via a Y-section 37 with a mixing tube 38. A spraying tube 39 is connected onto the mixing tube 38, with a nozzle 40 arranged at the end of the spraying tube. An air supply 41 is arranged between the mixing tube 38 and the nozzle 40. A compressor and/or a compressed air reservoir (not illustrated in FIG. 5) is connected to the air supply 41. In both reservoirs 35, 36 is located in each case a piston 42, 43, which by means of a feed device (not illustrated) is pushed in the direction of the white arrows 44, 45 into the cylindrical reservoirs 35, 36. The feed device, which preferably operates automatically, can, for example, be implemented in the form of spindle drives driven by electric motors, hydraulic rams, or pneumatic rams. The reservoirs 35, 36 are mounted on a handle 46, which is provided with an actuation device 47. If a user triggers the actuation device 47, the two pistons 42, 43 move in the direction of the horizontal white arrows 44, 45. Alternatively the feed device for the two pistons can be purely mechanical, for example, using a ratchet mechanism actuated by the user with the actuation device 47.

In the first reservoir 35 is located a first component 48, such as, for example, a resin component of any epoxy resin system, while the second reservoir is filled with another component 49, for example with the curing component of the resin system in question. By what is generally a synchronous movement of the two pistons 42, 43 in the direction of the arrows 44, 45 the components 48, 49 are pressed into the Y-section 37 and subsequently fully mixed with one another in the mixing tube 38 to form the desired stabilising material 50, based on two components. A non-synchronous travel of the pistons 42, 43 can become necessary if the mixing ratio between the components 48, 49 is not 1:1. As a result of the compressed air entering into the air supply 41 in the direction of the arrow 51 mixing of the stabilising material 50 with the inflowing compressed air takes place in the region of the spraying tube 39 to form an aerosol; this is then expanded in the nozzle 40 to form a conical spray mist 52, further accelerated and finally ejected. By means of the spraying tube 39, preferably flexibly configured in the form of a hose, whose outer diameter is approximately matched to the diameters of the holes within the surface layer of the sandwich plate that is being repaired, the stabilising material 50 can be injected into the compressed honeycomb-shaped cells.

To avoid blockage of the nozzle 40 and so as to be able to generate a sufficiently fine spray mist, the viscosity of the mixed stabilising material 50 must be sufficiently low.

REFERENCE SYMBOL LIST

1. Sandwich plate
2. Core structure
3. Surface layer
4. Surface layer
5. Cell (honeycomb-shaped)
6. Wall surface (cell)
7. Wall surface (cell)
8. Phenolic resin layer
9. Phenolic resin layer
10. Phenolic resin layer
11. Phenolic resin layer
12. Point load
13. Region of damage
14. Depression (cell)
15. Wall surface (cell)
16. Cell (honeycomb-shaped)
17. Spalled area
18. Spalled area
19. Drilled hole
20. Drilled hole
21. Drilled hole
22. Drilled hole
23. Stabilising material
24. Spraying device
25. Reservoir
26. Spraying tube
27. Nozzle
28. Pressure cartridge
29. Pressurised volume
30. Spray mist (stabilising material)
31. Collar
32. Actuation device (spraying device)
33. Filler material
34. Spraying device
35. Reservoir
36. Reservoir
37. Y-section
38. Mixing tube
39. Spraying tube
40. Nozzle
41. Air supply
42. Piston
43. Piston
44. Arrow
45. Arrow
46. Handle
47. Actuation device
48. Component (resin)
49. Component (curer)
50. Stabilising material
51. Arrow
52. Spray mist

What is claimed is:

1. A method for the repair of a sandwich plate having a core structure, a top surface layer, a bottom surface layer, a plurality of honeycomb-shaped cells, and a region of damage, at least one of the top and the bottom surface layer including a depression directing to the honeycomb-shaped cells, the method comprising:
providing at least one drill hole penetrating at least one of the top surface layer and the bottom surface layer near to one of the plurality of honeycomb-shaped cells in a damaged region of the sandwich plate;
injecting a stabilizing material into the honeycomb-shaped cell; and
filling the depression with a filler material, so as to achieve a flush connection with the at least one surface layer of the sandwich plate.

2. The method as recited in claim 1, wherein the sandwich plate is a floor plate in an aircraft.

3. The method as recited in claim 1, further comprising:
curing the stabilizing material in the depression,
wherein the filling is performed after the curing.

4. The method as recited in claim 1, wherein the filler material includes at least one of a curable, thermosetting plastic material and a polyester resin, filled with hollow glass spheres.

5. The method as recited in claim 4, wherein the stabilizing material comprises a two component epoxy resin, polyester resin, phenolic resin, or mixture of two or more of these.

6. The method as recited in claim 1, wherein the stabilizing material includes a plastic material based on one component.

7. The method as recited in claim 1, wherein the stabilizing material includes a plastic material based on two components.

8. The method as recited in claim 7, wherein the plastic material includes at least one of a curable epoxy resin, a polyester resin and a phenolic resin.

9. The method as recited in claim 1, wherein the filler material comprises a curable polyester resin, filled with hollow glass spheres.

10. The method as recited in claim 9, wherein the stabilizing material comprises a two component epoxy resin, phenolic resin, or mixture of two or more of these.

11. The method as recited in claim 1, wherein the filler material comprises a curable epoxy resin, filled with hollow glass spheres.

12. The method as recited in claim 11, wherein the stabilizing material comprises a two component polyester resin, phenolic resin, or mixture of two or more of these.

13. The method as recited in claim 1, wherein the core structure comprises a polyamide paper.

14. The method as recited in claim 1, wherein the core structure comprises a polyamide paper, where the polyamide paper is saturated, coated, or saturated and coated with material comprising a phenolic resin.

15. A method of applying a stabilizing material to a surface, the method comprising:
filling a reservoir of a spraying device with the stabilizing material,
wherein the spraying device includes:
a reservoir filled with stabilizing material including one component;
a spraying tube, wherein the reservoir is configured to dispense the stabilizing material into the spraying tube; and
a nozzle disposed downstream of the spraying tube and configured to atomize the stabilizing material so as to form a spray mist, and
wherein the spraying device is configured to repair a sandwich plate having a core structure, a top surface layer, a bottom surface layer, and a plurality of honeycomb-shaped cells, and a region of damage, at least one of the top and the bottom surface layer including a depression directing to the honeycomb-shaped cells,
wherein the method further comprises inserting the spraying tube through at least one drill hole penetrating at least one of the top surface layer and the bottom surface layer near to one of the plurality of honeycomb-shaped cells in the damaged region of the sandwich plate.

16. A method of applying a stabilizing material to a surface, comprising:
 filling a reservoir of a spraying device with the stabilizing material,
 wherein the spraying device includes:
  a first reservoir containing a first component and configured to dispense the first component;
  a second reservoir containing a second component different from the first component and configured to dispense the second component; and
  a Y-section connecting the first reservoir to the second reservoir, and
 wherein the spraying device is configured to repair a sandwich plate having a core structure, a top surface layer, a bottom surface layer, and a plurality of honeycomb-shaped cells, and a region of damage, at least one of the top and the bottom surface layer including a depression directing to the honeycomb-shaped cells,
 wherein the method further comprises inserting the spraying tube through at least one drill hole penetrating at least one of the top surface layer and the bottom surface layer near to one of the plurality of honeycomb-shaped cells in the damaged region of the sandwich plate.

17. The method as recited in claim 16, wherein the spraying device further includes:
 a spraying tube disposed downstream of the Y-section;
 a nozzle disposed downstream of the Y-section; and
 a mixing tube disposed downstream of the Y-section and configured to mix the first and the second component.

18. The method as recited in claim 16, wherein the spraying device further includes:
 an air supply disposed downstream of the mixing tube,
 wherein the air supply is connected to a compressor or a compressed air reservoir.

19. The method as recited in claim 16, wherein the first component includes a resin component of at least one of an epoxy resin system, a polyester resin system, and a phenolic resin system, and
 wherein the second component includes a curing component of at least one of the epoxy resin system, the polyester resin system, and the phenolic resin system.

* * * * *